Feb. 27, 1973    B. A. URBANICK    3,717,955

PANEL SEAL

Filed Jan. 10, 1972

United States Patent Office 3,717,955
Patented Feb. 27, 1973

3,717,955
PANEL SEAL
Burton Alfred Urbanick, La Grange, Ill., assignor to Met-L-Wood Corporation, Chicago, Ill.
Filed Jan. 10, 1972, Ser. No. 216,579
Int. Cl. E06b 7/23
U.S. Cl. 49—488    11 Claims

ABSTRACT OF THE DISCLOSURE

An expansion joint cover for a door panel assembly is disclosed. A gasketing having a U-shaped channel portion composed of a relatively rigid plastic-like material is secured to the perimeter of a door panel. Intersecting segments of the gasket along adjacent edges of the panel form joints whereat the cover members are applied. The expansion joint cover is an L-shaped sheet-like plastic member with each leg of the L composed of a relatively rigid material and the bight portion composed of a relatively flexible material. Each leg is ultrasonically welded to the base of the channel portion of respective ones of a pair of intersecting gasket segments to securely retain the segments in their assembled location while the flexible material overlying the joint accommodates normal expansion and contraction. Other features are disclosed.

INTRODUCTION

The present invention relates generally to edge gasketing for container doors, such as for use in cargo boxes, semi-trailer vans, truck bodies, railway freight cars, and the like. More particularly, the invention is directed to a new and improved expansion joint cover for such container door gaskets. The structure of the present invention is particularly useful in conjunction with edge gasketing and door closure seals of the type disclosed and claimed in U.S. Pat. 3,518,792, assigned to the same assignee as the present invention, although the utility of the present invention in other contexts will be appreciated by those skilled in the art.

SUMMARY OF THE INVENTION

The expansion joint cover of the present invention aids in securely retaining perimeter edge gasketing in place on a door panel while accommodating normal expansion and contraction encountered under widely varying environmental conditions, for example, from —40° F. to 150° F.

The cover of the invention is economical and easy to install by virtue of an ultrasonic welding technique which assures an intimate molecular bond between the edge gasketing and the cover member. The welding procedure itself is simplified by provision of an indexing or locating groove on each leg of the L-shaped cover to facilitate immediate and accurate location of the tip of the ultrasonic welding gun.

Manufacture of the door assembly is also facilitated by the present invention in those instances where the gasketing is secured to the door panel exclusively by means of an adhesive mastic. Under such circumstances, the mastic exerts prior to curing a resistive force tending to force the gasketing off the edge of the door panel. Installation of the expansion joint covers immediately following installation of the gasketing on the door panel secures the gasketing in place during the curing cycle thereby obviating the need for clamps or the like to perform this function.

The present invention is therefore directed to an expansion joint cover for a door panel assembly of a type including a rectangular door panel and a perimeter gasketing having a U-shaped channel portion composed of a relatively rigid plastic-like material. Intersecting segments of the gasketing along adjacent edges of the door panel form a joint for receiving the cover. The cover comprises an L-shaped member having each leg of the L composed of a relatively rigid plastic-like material and having the bight portion of the L composed of a relatively flexible plastic-like material.

The present invention is also directed to an improvement in a door panel assembly of a type comprising a rectangular door panel, a composite door panel gasket including a U-shaped channel portion composed of a relatively rigid plastic-like material. First and second spaced opposed sealing lips composed of a relatively flexible plastic-like material are integrally formed with and are directed oppositely to the channel legs. The channel portion of the composite gasket is secured to the peripheral edges of the door panel with intersecting segments of the composite gasket cooperating to form mitred joints at the corners of the door panel. Specifically, the improvement of the invention comprises an expansion joint cover means of a generally L-shaped configuration with each leg of the L being composed of a plastic-like material similar to that of the channel portions of the composite gasket. Each leg of the L is secured to the channel portion of a respective one of the intersecting gasket segments, preferably by ultrasonic spot welding. The bight portion of the L is composed of a relatively flexible plastic-like material and is positioned to overlie the mitred joint to accommodate expansion and contraction encountered in normal environmental conditions.

BRIEF DESCRIPTION OF THE DRAWINGS

The novel features of the present invention are set forth with particularity in the appended claims. The invention together with further objects and advantages thereof may best be understood, however, by reference to the following description taken in conjunction with the accompanying drawings in the several figures of which like reference numerals identify like elements and in which:

DESCRIPTION OF THE PREFERRED EMBODIMENTS

Figure 1:
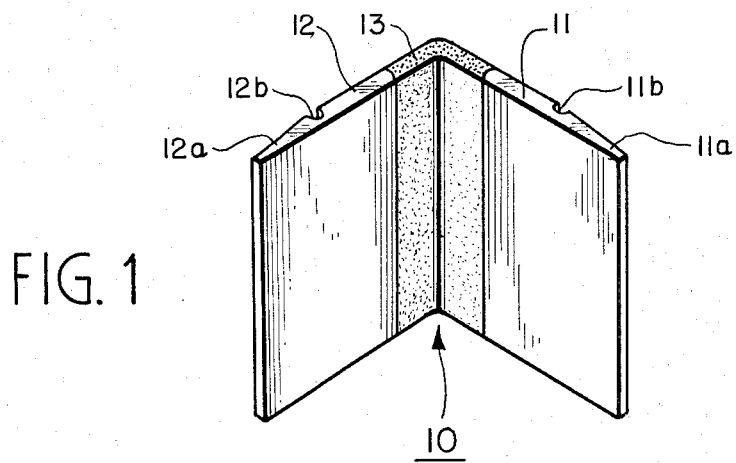
FIG. 1 is a side elevational view of an expansion joint cover means according to the present invention.

Referring now to FIG. 1, there is illustrated an expansion joint cover means constructed according to the present invention and generally designated by the reference numeral 10. The cover member 10 is of a generally L-shaped configuration and is composed of a relatively thin sheet of plastic-like material. The L-shaped member 10 includes a pair of legs 11 and 12 which in the present embodiment are formed of a relatively rigid plastic-like material, such as polyvinyl chloride of a 78 Shore D durometer. The bight portion 13 of a member 10 is, on the other hand, formed of a relatively flexible plastic-like material, such as polyvinyl chloride of a 65 Shore durometer. The member 10 is preferably manufactured by an extrusion technique which results in the relatively rigid legs 11, 12 and the relatively flexible bight portion 13 being formed as a unitary member. For reasons presently to be explained, the cover member 10 preferably includes indexing or locating means in the form of horizontal grooves 11b, 12b (not fully visible in FIG. 1) on each of the legs 11 and 12, respectively. Additionally, the ends 11a and 12a of the legs 11 and 12 are preferably tapered.

Figure 2:
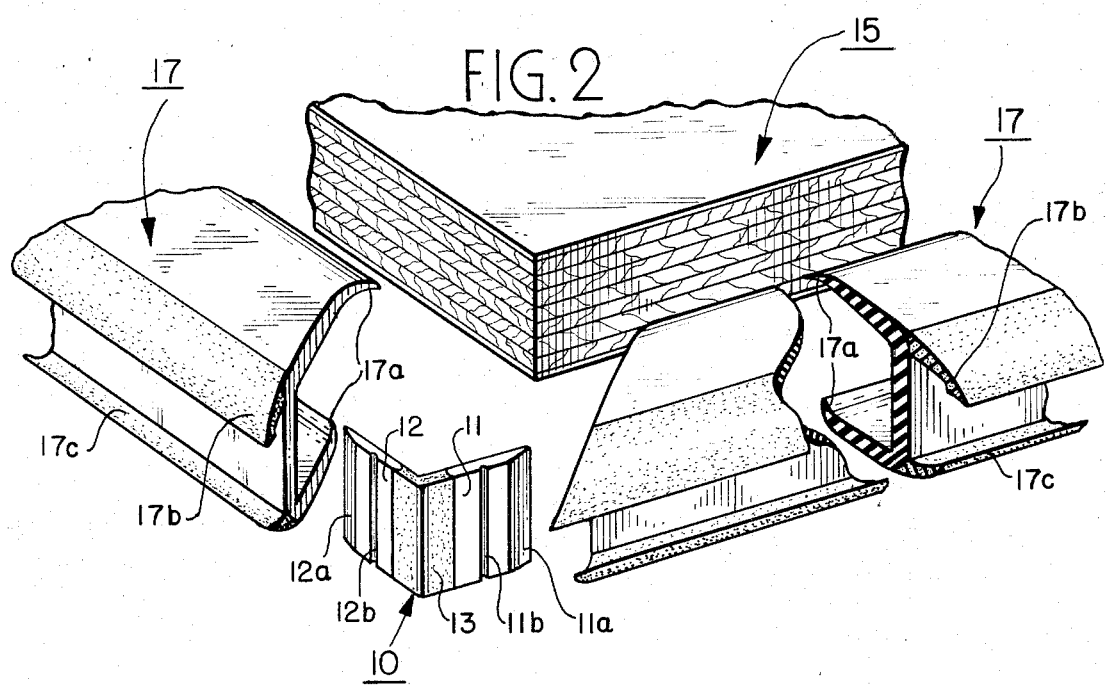
FIG. 2 is an exploded, perspective view of a corner of a door panel assembly embodying the present invention and illustrating the individual components prior to assembly.

Referring now to FIG. 2, a more complete understanding may be had of the utility of the expansion cover member 10 as part of an overall panel door assembly. The assembly there shown comprises a conventional rectangular door panel 15, only one corner portion of which is visible in the figure. The door panel 15 may be composed of any suitable material known to the art although it is preferred from the standpoint of structural integrity and resistance to moisture that the panel be constructed of a composite structural laminate comprising, for example, a laminated plywood panel to which there is adhesively bonded on opposed sides an outer cladding of sheet metal.

At any rate, the door panel 15 is provided with a perimeter gasketing designated by the reference numeral 17. The gasketing 17 comprises a generally U-shaped channel portion which in the present embodiment is composed of a relatively rigid plastic material. The channel portion of the gasketing 17 is snugly fitted along the edges of the panel 15 and is preferably secured thereto by an adhesive mastic (not shown). Inwardly curved tip portions 17a on each leg of the U-shaped channel of the gasketing 17 are composed of a relatively flexible plastic material to provide an intimate, resilient engagement with the opposing sidewalls of the door panel 15. The gasketing 17 also includes a first and second space opposed sealing lips 17b and 17c each composed of a relatively flexible plastic-like material. As shown, the lips 17b and 17c are integrally formed with the U-shaped channel portion of the gasketing and are directed oppositely to the channel legs. The specific structure of the gasketing 17 here illustrated and its manner of assembly to a door panel are disclosed in detail and claimed in the aforementioned U.S. patent.

Intersecting segments of the composite gasket 17 at each corner of the panel 15 are preferably cut on a 45° bias to form a mitred joint. The expansion joint cover member 10 is adapted to be positioned with its leg portions 11 and 12 overlying the channel base portions of respective ones of the intersecting gasket segments 17 and with its bight portion overlying the mating edges of the intersecting gasket segments.

Figure 3:
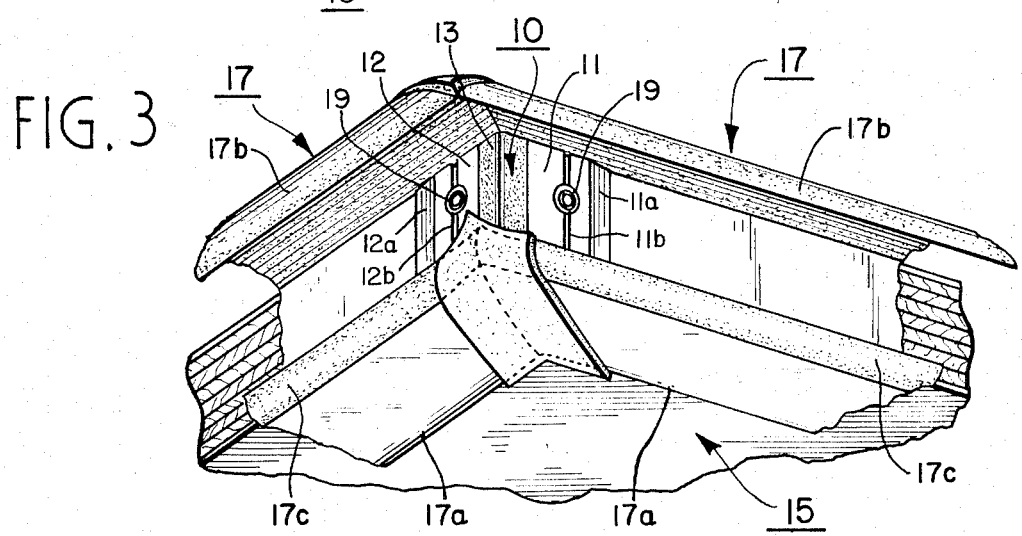
FIG. 3 is a side elevational view of the structure of FIG. 2, following assembly.

The door panel assembly of FIG. 2 is shown fully assembled in FIG. 3. The leg portions 11 and 12 of the expansion joint cover 10 are secured to the base portions of respective ones of the intersecting gasket segments 17, preferably by ultrasonic spot welding, the spot welds being denoted in the drawings by the reference numeral 19. Suitable methods for ultrasonically welding plastic members are known to the art and, therefore, will not be considered in detail herein. The individual spot welds 19 provide intimate molecular bonds between the base of the gasket channels 17 and the legs 11 and 12 of the expansion joint cover 10. In order to assure such an intimate molecular bond, it is preferable with current welding techniques that the leg portions 11, 12 be composed of a material closely similar or identical to that of the channel base portion. Herein, the rigid channel base portion of gasket 17 is composed of a polyvinyl chloride material of an approximately 78 Shore D durometer which corresponds identically to the composition of legs 11, 12 of member 10. The flexible sealing lips 17b and 17c as well as the inwardly curved tip portions 17a of gasketing 17 are composed of a polyvinyl chloride of an approximately 65 Shore A durometer.

The ultrasonic welds denoted at 19 in the drawing are facilitated by provision of indexing means in the form of grooves 11b and 12b which serve to properly locate the tip of the ultrasonic welding gun. The terminal portions 11a and 12a of the legs 11 and 12, respectively, are tapered to effect a gradual transition between the channel base and the main portion of the legs 11 and 12. Thus, the possibility of interference or snagging at the corner is effectively precluded.

The cover member 10 is preferably of a width corresponding to the distance between the spaced opposed sealing lips 17b and 17c. The member 10 provides a bridge between the intersecting gasket segments 17 which tends to maintain the gasketing 17 in secure engagement with the panel 15 and to complete a continuous hermetic seal about the periphery of the door panel. The flexible portion 13 of the member 10 accommodates expansion and contraction as may occur over a wide range of environmental condition to which the door panel is exposed, for example, from —40° F. to 150° F. Also, as previously mentioned, the cover member 10 is installed immediately following installation of the gasketing 17 on the door panel and serves to hold the gasketing in place during the curing period of the adhesive. Thus the need for clamps or similar securing devices during manufacture of the door assembly is obviated.

While particular embodiments of the present invention have been shown and described, it is apparent that various changes and modifications may be made, and it is therefore intended in the following claims to cover all such modifications and changes as may fall within the true spirit and scope of this invention.

The embodiments of the invention in which an exclusive property or privilege is claimed are defined as follows:

1. In a door panel assembly of a type comprising a rectangular door panel, a composite door panel gasket including a U-shaped channel portion composed of a relatively rigid plastic-like material and first and second spaced opposed sealing lips composed of a relatively flexible plastic-like material and integrally formed with and directed oppositely to the channel legs and further with said channel portion of said composite gasket being secured to the peripheral edges of said door panel and with intersecting segments of said composite gasket forming mitred joints at the corners of said door panel, the improvement comprising:

expansion joint cover means of a generally L-shaped configuration with each leg of said L being composed of a plastic-like material similar to that of said channel portions of said composite gasket and each leg being secured to the channel portion of a respective one of said intersecting gasket segments and with the bight portion of said L being composed of a relatively flexible plastic-like material.

2. The improvement of claim 1 in which said expansion joint cover means is in the form of a thin sheet of a width approximately equal to the distance between said spaced opposed sealing lips.

3. The improvement of claim 2 in which said legs of said L-shaped expansion joint cover means overlie and are ultrasonically welded to the channel base portions of respective ones of said intersecting gasket segments with said flexible portion of said cover means overlying the mitred corner joint.

4. The improvement of claim 3 in which each of said legs of said L-shaped expansion joint cover includes an indexing means for locating an ultrasonic welding apparatus.

5. The improvement of claim 4 in which the ends of each of said legs of said L-shaped expansion joint cover means are tapered.

6. The improvement of claim 5 in which said indexing means comprises a groove extending transversely across each leg of said L-shaped expansion joint cover means approximately midway along the length of each leg.

7. The improvement of claim 6 in which each leg of said L-shaped cover means is composed of a comparatively rigid polyvinyl chloride of an approximately 78 Shore D durometer and in which the bight portion of said L-shaped cover means is composed of a relatively flexible polyvinyl chloride of an approximately 65 Shore A durometer.

8. An expansion joint cover for a door panel assembly of a type including a rectangular door panel and a perimeter gasketing having a U-shaped channel portion composed of a relatively rigid plastic-like material secured to the edges of said door panel and with intersecting segments of said gasketing along adjacent edges of said door panel forming a joint for receiving said cover, comprising:

an L-shaped member having each leg of said L composed of a relatively rigid plastic-like material and having the bight portion of said L composed of a relatively flexible plastic-like material.

9. The cover of claim 8 in which the end portions of each of said legs of said L-shaped member are tapered and in which each leg includes a groove extending transversely across each leg approximately midway along the length of each leg.

10. In a door panel assembly of a type comprising a rectangular door panel and a perimeter gasketing having a U-shaped channel portion composed of a plastic-like material secured to the edges of said door panel and with intersecting segments of said gasketing along adjacent edges of said door panel forming mitred joints at the corners of said door panel, the improvement comprising:

expansion joint cover means of a generally L-shaped configuration and composed of a relatively thin sheet of plastic-like material with each leg of said L being ultrasonically welded to a respective one of said intersecting segments of said gasketing and with the bight of said L being composed of a relatively flexible plastic-like material and positioned to overlie said mitred joint.

11. The improvement of claim 10 in which each leg of said L-shaped cover means includes a grooved depression extending transversely across each leg of said L-shaped expansion joint cover means approximately midway along the length of each leg.

References Cited

UNITED STATES PATENTS

| | | | |
|---|---|---|---|
| 2,503,882 | 4/1950 | Medford | 49—479 X |
| 3,518,792 | 7/1970 | Williamson et al. | 49—488 |
| 3,553,301 | 1/1971 | Reardon et al. | 49—479 X |

DAVID J. WILLIAMOWSKY, Primary Examiner

P. C. KANNAN, Assistant Examiner

U.S. Cl. X.R.

49—479; 52—309, 656